(12) United States Patent
Srinath et al.

(10) Patent No.: US 12,277,090 B2
(45) Date of Patent: Apr. 15, 2025

(54) MECHANISM TO MAINTAIN DATA COMPLIANCE WITHIN A DISTRIBUTED FILE SYSTEM

(71) Applicant: NetApp, Inc., San Jose, CA (US)

(72) Inventors: Vijay Srinath, Karnataka (IN); Ramakrishna Rao Yadala, Karnataka (IN); Mohit Devarakonda, Hyderabad (IN); Shilpa Kumar, Karnataka (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/963,398

(22) Filed: Oct. 11, 2022

(65) Prior Publication Data

US 2024/0119025 A1 Apr. 11, 2024

(51) Int. Cl.
*G06F 16/00* (2019.01)
*G06F 1/08* (2006.01)
(Continued)

(52) U.S. Cl.
CPC .............. *G06F 16/125* (2019.01); *G06F 1/08* (2013.01); *G06F 11/1451* (2013.01); *G06F 11/1458* (2013.01); *G06F 11/1469* (2013.01); *G06F 11/2023* (2013.01); *G06F 12/0842* (2013.01); *G06F 16/172* (2019.01);
(Continued)

(58) Field of Classification Search
CPC .............. G06F 11/1458; G06F 11/1469; G06F 11/1451; G06F 11/2023; G06F 16/2358; G06F 16/1774; G06F 16/125; G06F 16/1842; G06F 16/172; G06F 3/0619; G06F 3/0632; G06F 3/0653; G06F 3/067; G06F 16/1824; H04L 67/1095; H04L 67/1097

See application file for complete search history.

(56) References Cited

U.S. PATENT DOCUMENTS 6,157,957 A * 12/2000 Berthaud .................. G06F 1/14
709/248
7,945,143 B2 * 5/2011 Yahata ................. H04N 9/8042
386/326

(Continued)

FOREIGN PATENT DOCUMENTS

EP 3422580 A1 * 1/2019
WO 2006116183 A1 11/2006
(Continued)

OTHER PUBLICATIONS

Jiang Lan et al., "Consistency maintenance in peer-to-peer file sharing networks", Proceedings the Third IEEE Workshop on Internet Applications. WIAPP 2003, Jun. 2003, pp. 1-5.*

(Continued)

*Primary Examiner* — Srirama Channavajjala
(74) *Attorney, Agent, or Firm* — Jaffery Watson Hamilton & DeSanctis LLP

(57) ABSTRACT

A method performed by one or more processing resources of one or more computer systems is disclosed. The method comprises receiving an object at a first of a plurality of nodes from a second of the plurality of storage nodes within a cluster switch fabric, examining a value associated included within the received object, wherein the value is associated with a clock value of the second node and updating a clock operating at the first node with the received value.

16 Claims, 11 Drawing Sheets

(51) Int. Cl.
  *G06F 11/14* (2006.01)
  *G06F 11/20* (2006.01)
  *G06F 12/0842* (2016.01)
  *G06F 16/11* (2019.01)
  *G06F 16/172* (2019.01)
  *G06F 16/176* (2019.01)
  *G06F 16/182* (2019.01)
  *H04L 67/1095* (2022.01)
  *H04L 67/1097* (2022.01)
(52) U.S. Cl.
  CPC ...... *G06F 16/1774* (2019.01); *G06F 16/1824* (2019.01); *H04L 67/1095* (2013.01); *H04L 67/1097* (2013.01); *G06F 2212/601* (2013.01)

(56) References Cited

U.S. PATENT DOCUMENTS

| | | | |
|---|---|---|---|
| 8,116,405 B2* | 2/2012 | Cho | H04J 3/0664 370/510 |
| 8,131,956 B2 | 3/2012 | Yamagami | |
| 9,019,996 B2* | 4/2015 | Fourcand | H04J 3/0682 370/503 |
| 9,626,105 B2 | 4/2017 | Bolik et al. | |
| 9,830,096 B2 | 11/2017 | Raj et al. | |
| 9,965,483 B2* | 5/2018 | Beaverson | G06F 16/188 |
| 10,158,444 B1* | 12/2018 | Darras | H03K 3/01 |
| 10,387,328 B2 | 8/2019 | Flynn et al. | |
| 10,831,720 B2* | 11/2020 | Mainali | H04L 67/1097 |
| 11,050,501 B2* | 6/2021 | Rentschler | H04L 12/28 |
| 11,461,203 B2 | 10/2022 | Hao et al. | |
| 2003/0053481 A1* | 3/2003 | Abiru | H04L 9/40 370/465 |
| 2003/0115227 A1* | 6/2003 | Guthery | G07F 7/1008 |
| 2005/0243958 A1* | 11/2005 | Fernald | H04L 7/0331 375/360 |
| 2005/0257022 A1* | 11/2005 | Hughes | G06F 3/0619 711/172 |
| 2007/0050520 A1* | 3/2007 | Riley | H04L 49/00 709/239 |
| 2008/0075128 A1* | 3/2008 | Fourcand | H04J 3/0602 370/520 |
| 2008/0282047 A1 | 11/2008 | Arakawa et al. | |
| 2010/0095164 A1* | 4/2010 | Kamei | G06F 3/065 714/48 |
| 2010/0232793 A1* | 9/2010 | Atkinson | H04L 49/602 370/386 |
| 2010/0290335 A1* | 11/2010 | Assarpour | H04L 45/245 370/216 |
| 2011/0191302 A1* | 8/2011 | Nasu | G06F 16/1774 707/E17.005 |
| 2012/0209855 A1* | 8/2012 | Shinjo | G06F 16/322 707/E17.012 |
| 2013/0091183 A1 | 4/2013 | Edwards et al. | |
| 2014/0223012 A1* | 8/2014 | Agarwala | H04L 41/0894 709/226 |
| 2015/0341422 A1* | 11/2015 | Färnlöf | G06F 9/542 709/202 |
| 2018/0075069 A1* | 3/2018 | Guim Bernat | H04L 67/5682 |
| 2019/0068486 A1* | 2/2019 | Maehara | H04L 45/24 |
| 2019/0108162 A1* | 4/2019 | Larson | G06F 16/2365 |
| 2019/0294205 A1* | 9/2019 | Zhao | G06F 1/12 |
| 2020/0127752 A1* | 4/2020 | Tai | H04J 3/0667 |
| 2021/0081432 A1 | 3/2021 | Grunwald et al. | |
| 2022/0121620 A1* | 4/2022 | Rath | G06F 21/602 |
| 2022/0263707 A1* | 8/2022 | Kanjirathinkal | H04L 41/0668 |
| 2024/0119005 A1 | 4/2024 | Srinath et al. | |

FOREIGN PATENT DOCUMENTS

| | | |
|---|---|---|
| WO | 2008154105 A2 | 12/2008 |
| WO | WO2010033255 A1 * | 3/2010 |
| WO | WO2011060965 A1 * | 5/2011 |
| WO | WO2011097235 A1 * | 8/2011 |
| WO | 2014093717 A1 | 6/2014 |
| WO | WO 2021050875 A1 * | 3/2021 |

OTHER PUBLICATIONS

O. Rodeh et al., "zFS—a scalable distributed file system using object disks", 20th IEEE/11th NASA Goddard Conference on Mass Storage Systems and Technologies, 2003. (MSST 2003). Proceedings. Apr. 2003, (pp. 207-218).*
Chuan Shan et al., "On-chip clock error characterization for clock distribution system", 2013 IEEE Computer Society Annual Symposium on VLSI, pp. 103-108.*
G. Shen et al., "Fast and Accurate Clock Recovery in Packet Switched Networks", 2004 IEEE, pp. 95-98.*
Momin O., et al., "An Object Interface Storage Node for Clustered File Systems," IEEE International Conference on Cluster Computing (Cluster), 2013, pp. 1-5.
Non-Final Office Action mailed on Dec. 8, 2023 for U.S. Appl. No. 17/977,123, filed Oct. 31, 2022, 24 pages.
Shivaram V., et al., "Queuing Models for Different Caching Schemes by Caching Partial Files," International Conference on Advances in Computing, Communications and Informatics (ICACCI), 2018, pp. 1234-1238.
Final Office Action mailed on Jun. 6, 2024 for U.S. Appl. No. 17/977,123, filed Oct. 31, 2022, 38 pages.
Non-Final Office Action mailed on Apr. 22, 2024 for U.S. Appl. No. 17/977,123, filed Oct. 31, 2022, 35 pages.
Final Office Action mailed Feb. 15, 2024 for U.S. Appl. No. 17/977,123, filed Oct. 31, 2022, 30 pages.
Non-Final Office Action mailed on Sep. 25, 2024 for U.S. Appl. No. 17/977,123, filed Oct. 31, 2022, 13 pages.

* cited by examiner

MECHANISM TO MAINTAIN DATA COMPLIANCE WITHIN A DISTRIBUTED FILE SYSTEM

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage. The storage file system may also be implemented to facilitate data compliance. Data compliance is a process that identifies applicable governance for data protection, security, storage and other activities and establishes policies, procedures and protocols ensuring data is fully protected from unauthorized access and use, malware and other cybersecurity threats.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
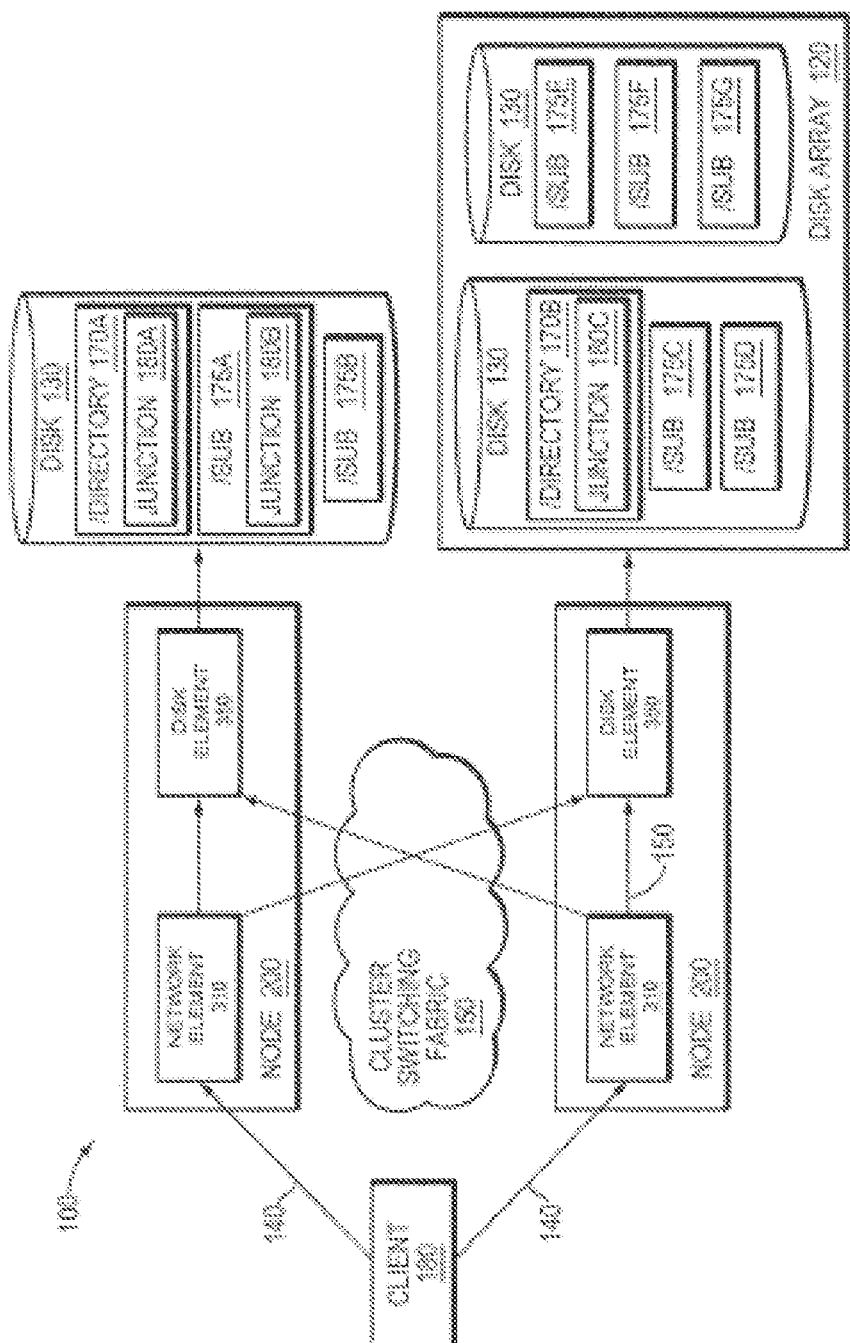
FIG. 1 illustrates one embodiment of block diagram of a plurality of nodes interconnected as a cluster.

In a distributed file system data compliance is enforced by precluding the modification of files until a predefined retention period has elapsed. Such a retention period must reference a secure clocking mechanism to adequately comply with compliance standards. However, the system time of a node cannot be used as a reference since it can be modified. For an example, a file placed in retention for a one month compliance period may easily be modified by changing the system time past the one month date and subsequently modifying the file. Thus, a secure clocking mechanism must be established within the distributed file system to ensure data compliance.

According to one embodiment, mechanisms to maintain data compliance within a distributed file system are described. In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element 310 and a disk element 350. The network element 310 includes functionality that enables the node 200 to connect to clients 180 over a computer network 140, while each disk element 350 connects to one or more storage devices, such as disks 130 of a disk array 120. The nodes 200 are interconnected by a cluster switching fabric 150 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node 200 comprising one network elements and one disk element should be taken as illustrative only.

Clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements 350 are illustratively connected to disks 130, that may be organized into disk arrays 120. Alternatively, storage devices other than disks may be utilized, e.g., flash memory, optical storage, solid state devices, etc. As such, the description of disks should be taken as exemplary only. As described below, in reference to FIG. 3, a file system 360 may implement a plurality of flexible volumes on the disks 130. Flexible volumes may comprise a plurality of directories 170 A, B and a plurality of subdirectories 175 A-G. Junctions 180 A-C may be located in directories 170 and/or subdirectories 175. It should be noted that the distribution of directories 170, subdirectories 175 and junctions 180 shown in FIG. 1 is for illustrative purposes. As such, the description of the directory structure relating to subdirectories and/or junctions should be taken as exemplary only.

Storage System Node

Figure 2:
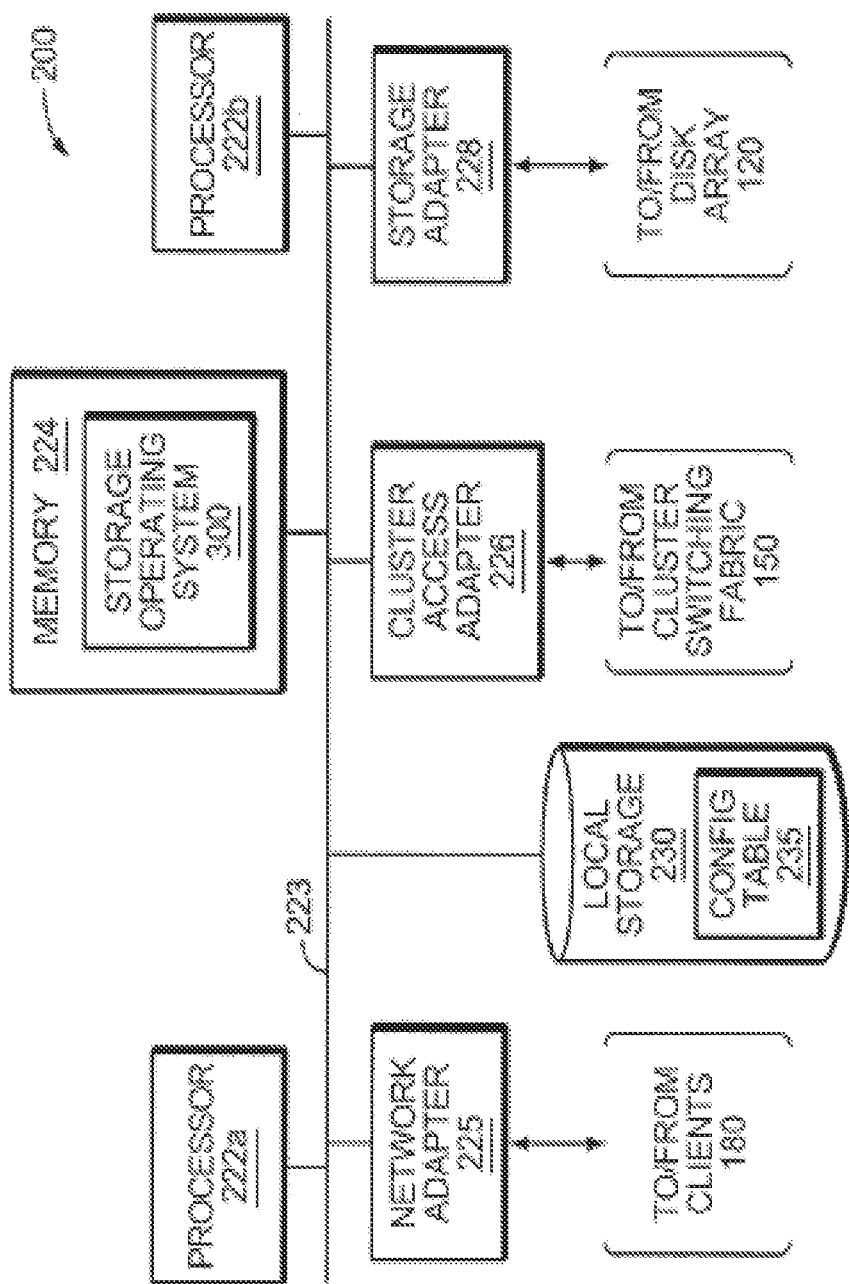
FIG. 2 illustrates one embodiment of a block diagram of a node.

FIG. 2 is a schematic block diagram of a node 200 that is illustratively embodied as a storage system comprising a plurality of processors 222 a and b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222 a executes the functions of the network element 310 on the node, while the other processor 222 b executes the functions of the disk element 350.

The memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described herein, the information is stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Illustratively, the storage operating system is preferably the Data ONTAP® operating system available from NetApp™, Inc., San Jose, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Figure 3:
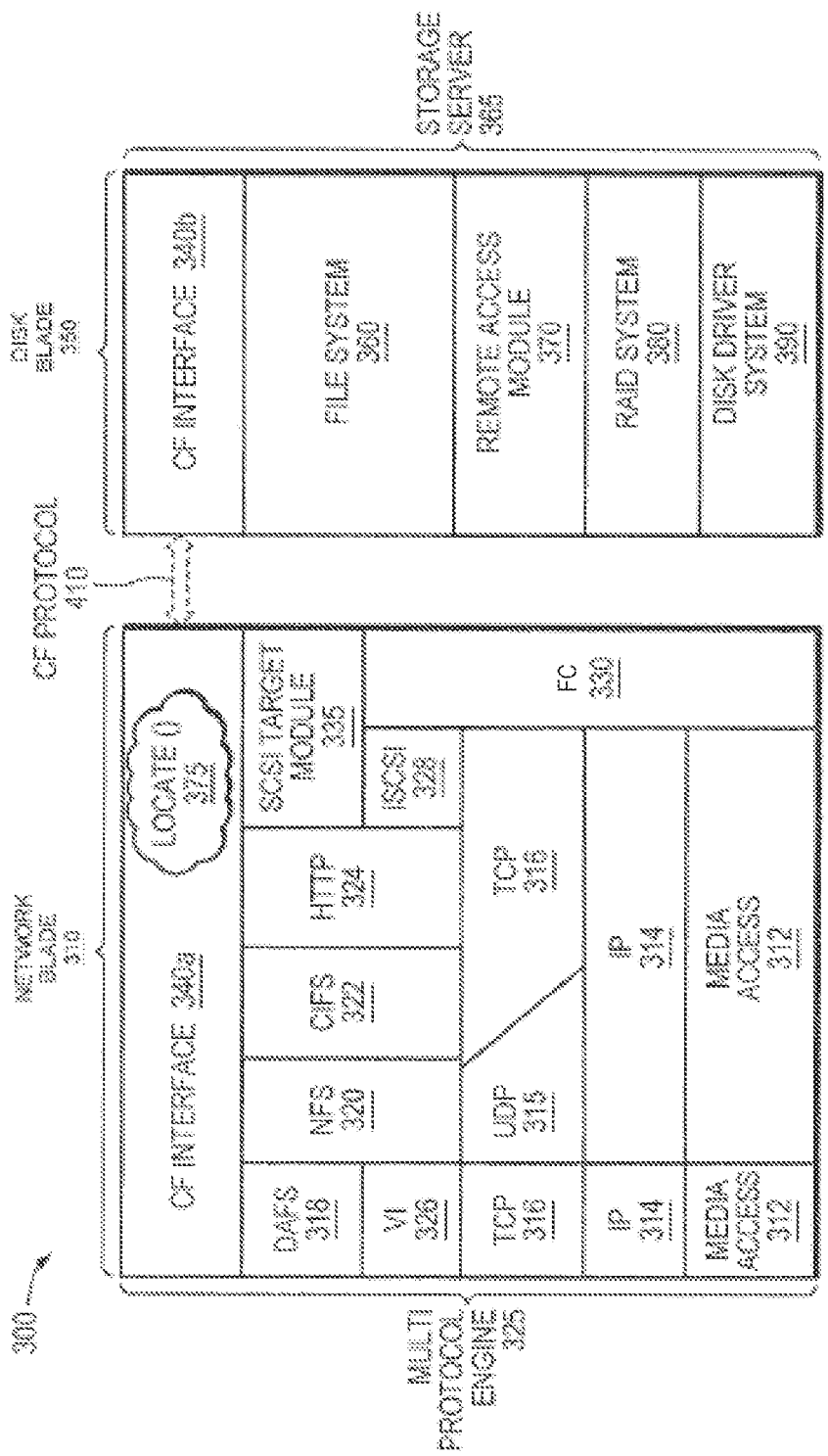
FIG. 3 illustrates one embodiment of a block diagram of a storage operating system.

FIG. 3 is a schematic block diagram of the storage operating system 300 that may be advantageously used with the subject matter. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system 360 having an on-disk format representation that is block-based using, e.g., 4 kilobyte (kB) blocks and using index nodes ("Modes") to identify files and file attributes (such as creation time, access permissions, size and block location). The file system uses files to store meta-data describing the layout of its file system; these meta-data files include, among others, an Mode file. A file handle, i.e., an identifier that includes an Mode number, is used to retrieve an Mode from disk.

Broadly stated, all Modes of the write-anywhere file system are organized into the Mode file. A file system (fs) info block specifies the layout of information in the file system and includes an Mode of a file that includes all other Modes of the file system. Each logical volume (file system) has an fsinfo block that is preferably stored at a fixed location within, e.g., a RAID group. The Mode of the Mode file may directly reference (point to) data blocks of the Mode file or may reference indirect blocks of the Mode file that, in turn, reference data blocks of the Mode file. Within each data block of the Mode file are embedded Modes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the Mode file using the Mode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

CF Protocol

Illustratively, the storage server 365 is embodied as disk element 350 of the storage operating system 300 to service one or more volumes of array 120. In addition, the multi-protocol engine 325 is embodied as network element 310 to (i) perform protocol termination with respect to a client issuing incoming data access request packets over the network 140, as well as (ii) redirect those data access requests to any storage server 365 of the cluster 100. Moreover, the network element 310 and disk element 350 cooperate to provide a highly scalable, distributed storage system architecture of the cluster 100. To that end, each module includes a cluster fabric (CF) interface module 340 *a,b* adapted to implement intra-cluster communication among the modules, including disk element to disk element communication for data container striping operations described herein.

The protocol layers, e.g., the NFS/CIFS layers and the iSCSI/IFC layers, of the network element 310 function as protocol servers that translate file-based and block based data access requests from clients into CF protocol messages used for communication with the disk element 350. That is, the network element servers convert the incoming data access requests into file system primitive operations (commands) that are embedded within CF messages by the CF interface module 340 for transmission to the disk elements 350 of the cluster 100. Notably, the CF interface modules 340 cooperate to provide a single file system image across all disk elements 350 in the cluster 100. Thus, any network port of a network element that receives a client request can access any data container within the single file system image located on any disk element 350 of the cluster.

Further, in an illustrative aspect of the disclosure, the network element 310 and disk element 350 are implemented as separately scheduled processes of storage operating system 300; however, in an alternate aspect, the modules may be implemented as pieces of code within a single operating system process. Communication between a network element and disk element is thus illustratively effected through the use of message passing between the modules although, in the case of remote communication between a network element and disk element of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

The CF interface module 340 implements the CF protocol for communicating file system commands among the modules of cluster 100. Communication is illustratively effected by the disk element exposing the CF API to which a network element (or another disk element) issues calls. To that end, the CF interface module 340 is organized as a CF encoder and CF decoder. The CF encoder of, e.g., CF interface 340 a on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340 b on disk element 350 de-encapsulates the CF message and processes the file system command.

Illustratively, the remote access module 370 may utilize CF messages to communicate with remote nodes to collect information relating to remote flexible volumes. A CF message is used for RPC communication over the switching fabric 150 between remote modules of the cluster 100; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster 100; the CF protocol layer is that portion of a message that carries the file system commands Illustratively, the CF protocol is datagram based and, as such, involves transmission of messages or "envelopes" in a reliable manner from a source (e.g., a network element 310) to a destination (e.g., a disk element 350). The RC layer implements a reliable transport protocol that is adapted to process such envelopes in accordance with a connectionless protocol, such as UDP.

File System Organization

In one embodiment, a data container is represented in the write-anywhere file system as an Mode data structure adapted for storage on the disks 130. In such an embodiment, an Mode includes a meta-data section and a data section. The information stored in the meta-data section of each Mode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each Mode may be interpreted differently depending upon the type of file (Mode) defined within the type field. For example, the data section of a directory Mode includes meta-data controlled by the file system, whereas the data section of a regular Mode includes file system data. In this latter case, the data section includes a representation of the data associated with the file.

Specifically, the data section of a regular on-disk Mode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the Mode, file system data having a size that is less than or equal to 64 bytes is represented, in its entirety, within the data section of that Mode. However, if the length of the contents of the data container exceeds 64 bytes but less than or equal to 64 KB, then the data section of the Mode (e.g., a first level Mode) comprises up to 16 pointers, each of which references a 4 KB block of data on the disk.

Moreover, if the size of the data is greater than 64 KB but less than or equal to 64 megabytes (MB), then each pointer in the data section of the Mode (e.g., a second level Mode) references an indirect block (e.g., a first level L1 block) that contains 1024 pointers, each of which references a 4 KB data block on disk. For file system data having a size greater than 64 MB, each pointer in the data section of the Mode (e.g., a third level L3 Mode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk 130 into the memory 224. In other embodiments, higher levels are also possible that may be used to handle larger data container sizes.

When an on-disk Mode (or block) is loaded from disk 130 into memory 224, its corresponding in-core structure embeds the on-disk structure. The in-core structure is a block of memory that stores the on-disk structure plus additional information needed to manage data in the memory (but not on disk). The additional information may include, e.g., a "dirty" bit. After data in the Mode (or block) is updated/modified as instructed by, e.g., a write operation, the modified data is marked "dirty" using the dirty bit so that the Mode (block) can be subsequently "flushed" (stored) to disk.

According to one embodiment, a file in a file system comprises a buffer tree that provides an internal representation of blocks for a file loaded into memory 224 and maintained by the write-anywhere file system 360. A root (top-level) buffer, such as the data section embedded in an Mode, references indirect (e.g., level 1) blocks. In other embodiments, there may be additional levels of indirect blocks (e.g., level 2, level 3) depending upon the size of the file. The indirect blocks (e.g., and Mode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks 130.

In one embodiment, a file system layout is provided that apportions an underlying physical volume into one or more virtual volumes (or flexible volume) of a storage system, such as node 200. In such an embodiment, the underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 4:
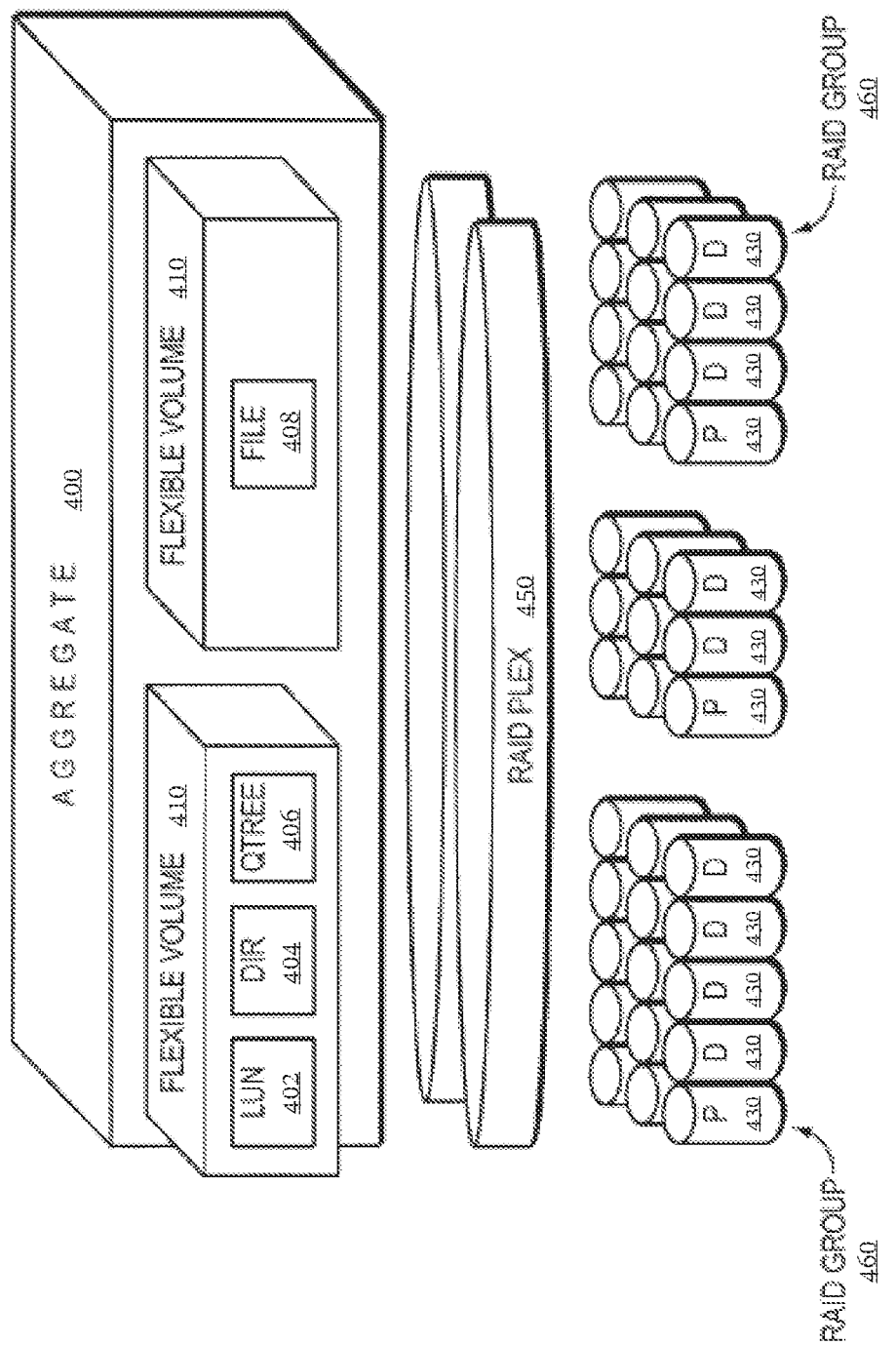
FIG. 4 illustrates one embodiment of a block diagram of an aggregate.

FIG. 4 illustrates one embodiment of a block diagram of an aggregate 400. Luns (blocks) 402, directories 404, qtrees 406 and files 408 may be included within flexible volumes 410, such as dual vbn flexible volumes, that, in turn, are contained within the aggregate 400. In one embodiment, the flexible volumes 410 include elements within the flexible volumes that may comprise junctions to provide redirection information to other flexible volumes, which may be contained within the same aggregate 400, may be stored in aggregate service by other key modules in the distributed file system. The description of elements being stored within a flexible volume 410 should be taken as exemplary only. The aggregate 400 is illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk.

Whereas the aggregate 400 is analogous to a physical volume of a conventional storage system, a flexible volume is analogous to a file within that physical volume. That is, the aggregate 400 may include one or more files, wherein each file contains a flexible volume 410 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 410 is also a logical volume, it has its own block allocation structures (e.g., active, space and summary maps) in its vvbn space.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories for flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 5:
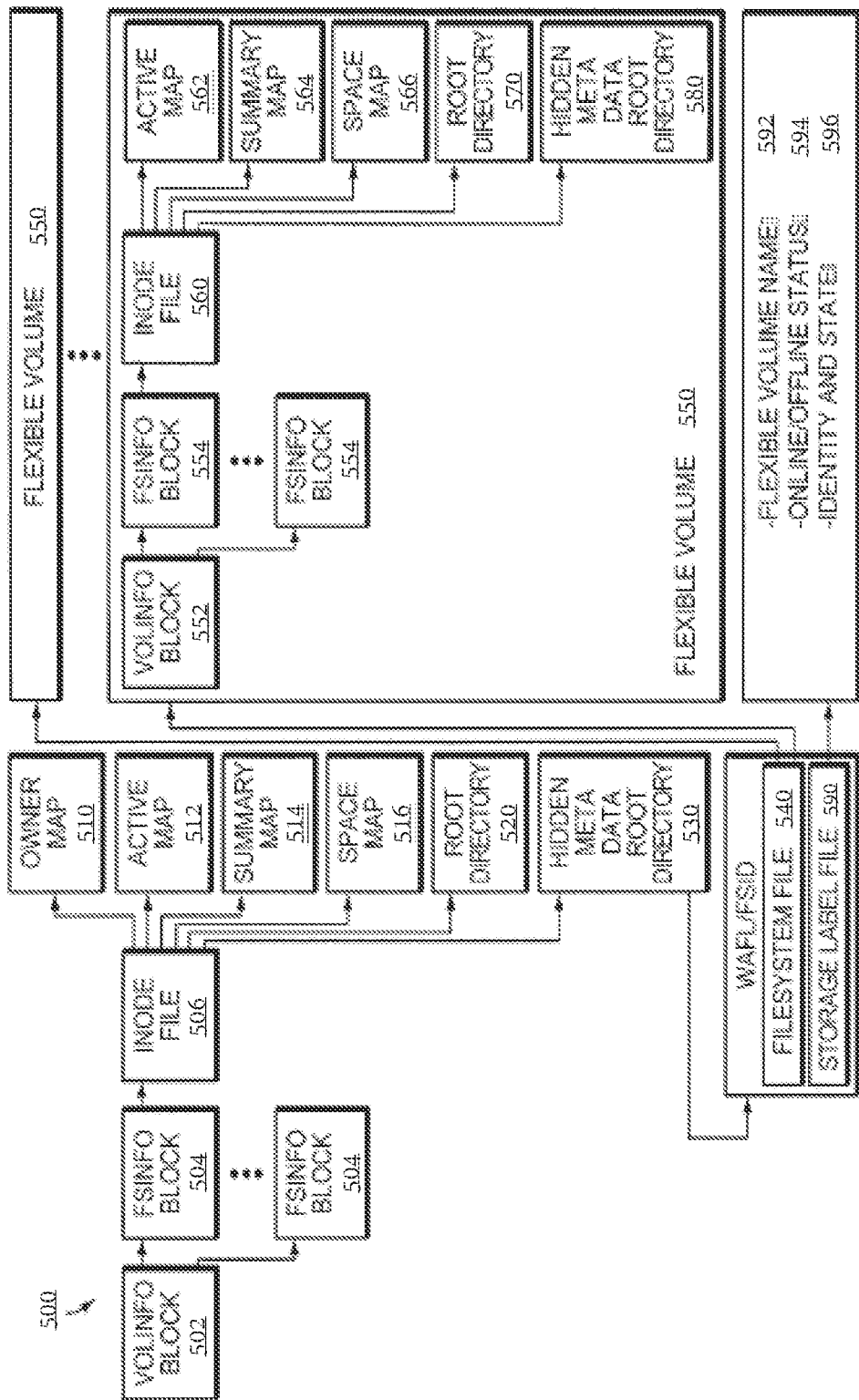
FIG. 5 illustrates one embodiment of a block diagram of an on-disk layout of the aggregate.

FIG. 5 illustrates one embodiment of a schematic block diagram of an on-disk representation of an aggregate 500. The storage operating system 300, e.g., the RAID system 380, assembles a physical volume of pvbns to create the aggregate 500, with pvbns 1 and 2 comprising a "physical" volinfo block 502 for the aggregate. The volinfo block 502 contains block pointers to fsinfo blocks 504, each of which may represent a snapshot of the aggregate. Each fsinfo block 504 includes a block pointer to an Mode file 506 that contains Modes of a plurality of files, including an owner map 510, an active map 512, a summary map 514 and a space map 516, as well as other special meta-data files. The Mode file 506 further includes a root directory 520 and a "hidden" meta-data root directory 530, the latter of which includes a namespace having files related to a flexible volume in which users cannot "see" the files. The hidden meta-data root directory includes the WAFL/fsid/directory structure that contains file system file 540 and storage label file 590. Note that root directory 520 in the aggregate is empty; all files related to the aggregate are organized within the hidden meta-data root directory 530.

In addition to being embodied as a container file having level 1 blocks organized as a container map, the file system file 540 includes block pointers that reference various file systems embodied as flexible volumes 550. Each flexible volume 550 has special reserved Mode numbers within its flexible volume space that are used for, among other things, the block allocation bitmap structures. As noted, the block allocation bitmap structures, e.g., active map 562, summary map 564 and space map 566, are located in each flexible volume.

Specifically, each flexible volume 550 has the same Mode file structure/content as the aggregate, with the exception that there is no owner map and no WAFL/fsid/file system file, storage label file directory structure in a hidden meta-data root directory 580. To that end, each flexible volume 550 has a volinfo block 552 that points to one or more fsinfo blocks 554, each of which may represent a snapshot, along with the active file system of the flexible volume. Each fsinfo block, in turn, points to an Mode file 560 that, as noted, has the same Mode structure/content as the aggregate with the exceptions noted above. Each flexible volume 550 has its own Mode file 560 and distinct Mode space with corresponding Mode numbers, as well as its own root directory 570 and subdirectories of files that can be exported separately from other flexible volumes.

The storage label file 590 contained within the hidden meta-data root directory 530 of the aggregate is a small file that functions as an analog to a conventional raid label. A raid label includes physical information about the storage system, such as the volume name; that information is loaded into the storage label file 590. Illustratively, the storage label file 590 includes the name 592 of the associated flexible volume 550, the online/offline status 594 of the flexible volume, and other identity and state information 596 of the associated flexible volume (whether it is in the process of being created or destroyed).

Figure 6:
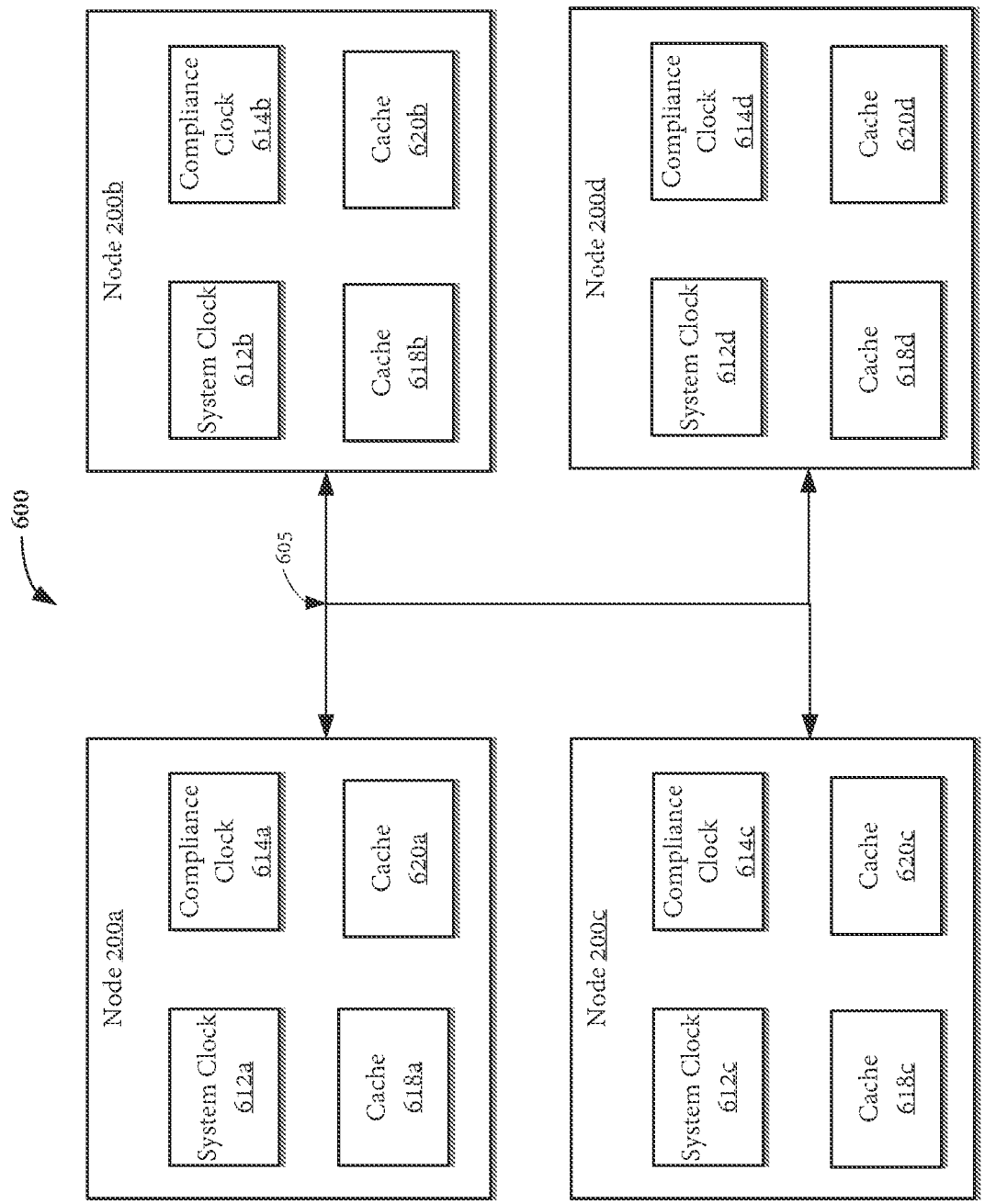
FIG. 6 illustrates another embodiment of a block diagram of a cluster of nodes.

FIG. 6 illustrates another embodiment of a block diagram of a cluster 600, which may be implemented to process data in accordance with compliance standards. As shown in FIG. 6, cluster 600 includes nodes 200a-200d coupled via an interface 605. According to one embodiment, each node 200 includes a system clock 612 (e.g., 612a-612d). In such an embodiment, each system clock 612 is independent from the other system clocks 612, and comprises a continuous pulse that is used to synchronize hardware (e.g., processors 222, memory 224, adapters 225, 226 and 228, etc.) operations within its respective node 200.

As discussed above, system clocks 612 are not typically used for data compliance applications since they may be modified. Thus, each node 200 also includes a compliance clock 614 (e.g., 614a-614d). In one embodiment, a compliance clock 614 is initialized with a time value at, the time of creation, stored in memory and used for compliance (e.g., w compute a retention period from the time compliance clock 614 initialized). In such an embodiment, a compliance clock 614 is created upon a flexible volume being stored at the node being selected to operate in a compliance mode.

In a further embodiment, compliance mode implements one or more storage devices within local storage 230 configured Write Once Read Many (WORM) devices so that data cannot be deleted until the data retention period has been reached. As used herein, a retention period is defined as a life cycle that identifies a duration of time for which information should be maintained. Retention periods vary with different types of information, based on content and a variety of other factors (e.g., internal organizational need, regulatory requirements for inspection or audit, legal statutes of limitation, involvement in litigation, etc.)

Whenever a compliance clock 614 is requested, a difference value is computed between the current system clock 612 and the compliance clock 614 value stored in memory. This difference value is subsequently added to the stored compliance clock 614 value and returned (e.g., back to the requestor). As a result the returned compliance clock 614 will reflect the latest value. Periodically, the compliance clock 614 value is updated using the same approach (e.g., adding the difference value) and written back to memory. This process may occur once every 24 hours, whenever there is a consistency point (CP) of a flexible volume, or upon mounting of a flexible volume at a node 200. As used herein, a CP comprises a process of writing data to disk and updating active file system pointers.

Group Client Clock Configuration

Compliance clocks 614 are suitable for applications in which flexible volumes are individually deployed (e.g., on a single node). However, a problem occurs in embodiments in which a group of flexible volumes (or constituents) is deployed within the distributed file system. In this embodiment, a group of constituents (e.g., A, B, C and D) may be distributed across nodes 200. Thus, four different system clocks are used to create compliance clocks 614a, 614b, 614c and 614d, resulting in tour different compliance clocks 614 for the group. Having four different compliance clocks makes it difficult to compute a retention period for the group of flexible volumes.

According to one embodiment, a mechanism to provide for compliance application in a distributed file system implementing groups of flexible volumes is described herein. As shown in FIG. 6, each node 200 also includes an object cache 618 (e.g., 618a-618d) that includes member (or MemberState) objects that records current information (or properties) associated with a constituent as attributes (e.g., how much free space the constituent has, how much capacity it has, how many recent remote-subdir allocations have been received, etc.). In one embodiment, the MemberState objects of one group of flexible volumes are grouped under a group (or GroupState) object on each node 200. A GroupState object is a collective object that stores a summary of the MemberState objects, as well as other group-related statistics and data. In this embodiment, member states and the group state are updated via a group refresh operation by periodically exchanging GroupState and MemberState objects between nodes 200 (e.g., via CF interface modules 340 discussed above) using interface 605. The refresh process is a background task that is performed periodically (e.g., every second) for each group of flexible volumes. In a further embodiment, the refresh process selects a non-local volume and exchanges the GroupState data with the node 200 at which the volume is stored. The peer node 200 selected is chosen in a round-robin manner, and the transmitted request includes the usage data for each of MemberState object. The receiving Node 200 merges the received data with its own in-core state, and in response returns its own resulting combined GroupState object.

In one embodiment, a compliance clock 614 is generated and updated for a root constituent in a manner as discussed above. As used herein, a root constituent comprises a constituent on which the file system root directory exists. In such an embodiment, the compliance clock value is stored as an attribute (or root_constituent_vcc) within the MemberState object for transmission as a refresh message to the other nodes 200 of the group during a group refresh operation.

Figure 7:
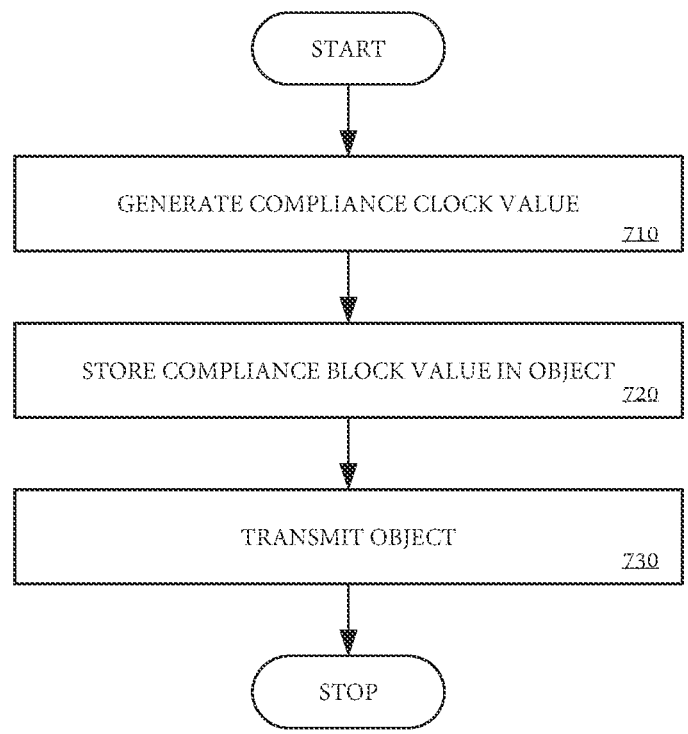
FIG. 7 is a flow diagram illustrating one embodiment of a process to generate a compliance clock at a node.

FIG. 7 is a flow diagram illustrating one embodiment of a process to generate a compliance clock at a node 200. At processing block 710, a compliance clock value is venerated. As discussed above, the compliance clock value is generated using the node system clock. At processing block 720, the compliance clock value is stored as a component of the MemberState object. At processing block 730, the MemberState object is transmitted to one or more constituents located at other nodes in the cluster.

Upon receiving the root_constituent_vcc value, a non-root node (or target node) 200 compares the received root_constituent_vcc value with the locally stored root_constituent_vcc value. The target node 200 replaces the locally stored root_constituent_vcc value with the received root_constituent_vcc value (e.g., within its MemberState object) upon a determination that the received root_constituent_vcc value is greater than the local root_constituent_vcc, value. Additionally, the target node 200 stores the system clock 612 time at which the update occurred. This update time ensures that the compliance clocks 614 at the non-root nodes 200 are synchronized with the root compliance clock 614 in instances in which the group refresh operation has been delayed.

In one embodiment, each node 200 includes an existing secure clock thread that updates the in memory system clock 612 and compliance clock 614 values for all compliance constituents at predetermined intervals (e.g., every 15 seconds for the system clock and once a day, or when there is a CP or a volume mount). In a further embodiment, this process also handles group constituent compliance clock 614 updates. For non-root constituents, the thread extracts the root_constituent_vcc value included in the MemberState object, reads the root_constituent_vcc value and updates the compliance clock 614 of the node 200 with the root_constituent_vcc. This ensure that the compliance clock 614 returned for non-root nodes 200 mirror the root compliance clock 614.

Figure 8:
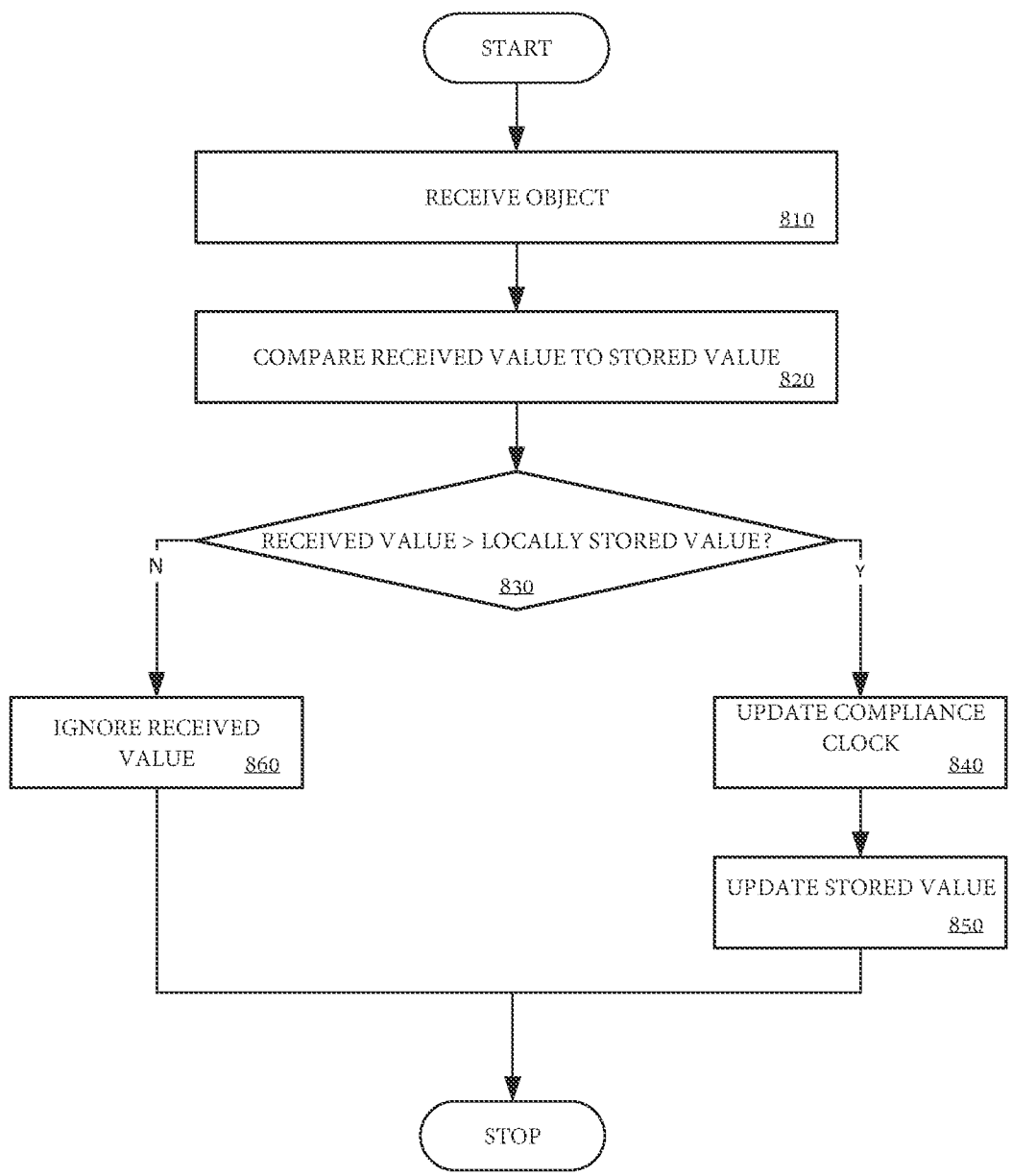
FIG. 8 is a flow diagram illustrating one embodiment of a process to synchronize a compliance clock at a node.

FIG. 8 is a flow diagram illustrating one embodiment of a process to synchronize a compliance clock at a node 200. At processing block 810, the MemberState object is received during a group refresh operation. Subsequently, the MemberState object is processed to extract and examine the root_constituent_vcc value. At processing block 820, the received root_constituent_vcc value is compared to the locally stored root_constituent_vcc value. At decision block 830, a determination is made as to whether the root_constituent_vcc value is greater than the locally stored root_constituent_vcc value. If so, the local compliance clock value is updated with the received root_constituent_vcc value, processing block 840. At processing block 850, the locally stored root_constituent_vcc value is updated to the received root_constituent_vcc value. Upon a determination at decision block 830 that the root_constituent_vcc value is less than the locally stored root_constituent_vcc the received root_constituent_vcc value is discarded (or ignored), processing block 860.

In an example of the above-described processes using a four constituent embodiment in FIG. 6 (e.g., constituents A, B, C and D), in which each constituent exists on a different node (e.g., 200*a*, 200*b*, 200*c* and 200*d*), the compliance clock 614 of each of the constituents is established based on its respective system clock 612 at the time of creation of the group of flexible volumes (e.g, time to). However, the root_constituent_vcc value stored by each constituent is 0. After a first group refresh operation (e.g., at time ti), a root constituent (e.g., at node 200*a*) may transmit a refresh message to a non-root constituent (e.g., at node 200*b*). As a result, the compliance clock 614*a* is read, stored in the MemberState object as a root_constituent_vcc value and transmitted to node 200*b*.

Upon processing the refresh message, node 200*b* updates its root constituent member state information. As part of the update, node 200*b* compares the received root_constituent_vcc value with the locally stored root_constituent_vcc value (e.g., which is currently 0). As a result, the locally stored root_constituent_vcc value is updated to include the received the root_constituent_vcc value.

After a second group refresh operation (e.g., at time b), node 200*a* may transmit a refresh message to a second non-root constituent (e.g., at node 200*c*), while node 200*b* may transmit a refresh message to a third non-root constituent (e.g., at node 200*d*). Upon processing the refresh message from node 200*a*, node 200*c* updates its root constituent member state information by updating the locally stored root_constituent_vcc value (e.g., which is currently 0) to include the received root_constituent_vcc value. However, upon processing the refresh message from node 200*b*, node 200*d* ignores the received root_constituent_vcc value (e.g., which is currently 0) since it has already been updated with a greater value (e.g., the root_constituent_vcc value received at time ti from node 200*a*).

A first scenario used to evaluate the above-described compliance clock mechanism occurs upon detecting that the root constituent is offline or unreachable. In this scenario the locally stored root_constituent_vcc value at the non-root nodes remain unchanged. However, the root_constituent_vcc value appears to continue to be updated (or tick) when the secure clock thread reads the stored value because elapsed time has been added since the last update, as discussed above. However, there is a possibility that the non-root constituent compliance clock 614 may be set to an older value if the root constituent compliance clock 614 has lost time. This may result in any retention periods computed for files on the non-root constituents during the time when the root constituent was offline being stretched since the compliance clock 614 on these constituents may go back in time once they are synchronized with the root constituent compliance clock 614. Compliance is maintained in this scenario, however, since this occurrence causes a longer retention time, rather than a shortening of the retention.

In a second scenario the non-root constituent is offline or unreachable. In this case, the non-root constituent compliance clock 614 will not be updated until returning online. Once online, the non-root constituent compliance clock 614 will be updated with the root constituent compliance clock 614. There is no impact on retention times in this scenario.

Another scenario involves non-disruptive operation events and constituent volume moves. In these cases, the compliance clock 614 after an event will be stale until a subsequent group refresh operation. A stale compliance clock 614 may increase the retention time, which maintains compliance. One more scenario involves volume expand in which new constituents initially inherit the compliance clock 614 from the node system clocks on which they are hosted. However, the root_constituent_vcc value is initially set to 0 in the respective MemberState objects and will update the local root_constituent_vcc value to reflect the received root_constituent_vcc value upon the first FG-Refresh.

Consistent Client Configuration Settings

Another issue that may occur during compliance applications involves configuration settings in which each constituent in a group of flexible volumes has various configuration parameters that may be set. For example, settings may include default-retention-period, autocommit-period, volume-append-mode. etc. These settings are stored in the WAFL directory structure and is accessed in the applicable node 200. In the case of a group of flexible volumes, these attributes are also stored on all the constituents. However, when a change to these settings are made it may be necessary to ensure that the change is reflected on all constituents. For example, if the default-retention-period setting is changed on the group of flexible volumes, and that modification succeeds only on some constituents and not on others, files may end up with different retention periods based on the constituents on which they reside. This may result in possible compliance violations.

According to one embodiment, configuration changes are applied only at the root constituent and a compliance configuration resource cache file is included in a configuration resource cache 620 for all non-root constituents (e.g., 620*a*-620*d*). In such an embodiment, the compliance configuration properties are stored in both memory and in the configuration resource cache file. In a further embodiment, memory configuration settings are used in instances in which a target volume of the operation is the root constituent. Operations comprise any type of compliance operation that is to be performed on a file.

However, if the target volume of the operation is a non-root constituent a determination is made as to whether a configuration resource cache exists. If so, the memory configuration settings are considered valid, and thus used. The configuration resource cache 620 is re-established upon determining that the configuration resource cache 620 is missing. This results in retrieving the latest configuration settings from the root constituent In one embodiment, the configuration settings are retrieved via remote access module 370 that creates a local cache of a remote file, read from the remote file and populate the contents in the cache. Additionally, the memory configuration settings of the constituent are updated to ensure that latest configuration settings are available across the group of flexible volumes. A failure to establish the cache results in the operation failing to make sure that the operation will not be allowed to operate on possibly stale configuration values.

Figure 9:
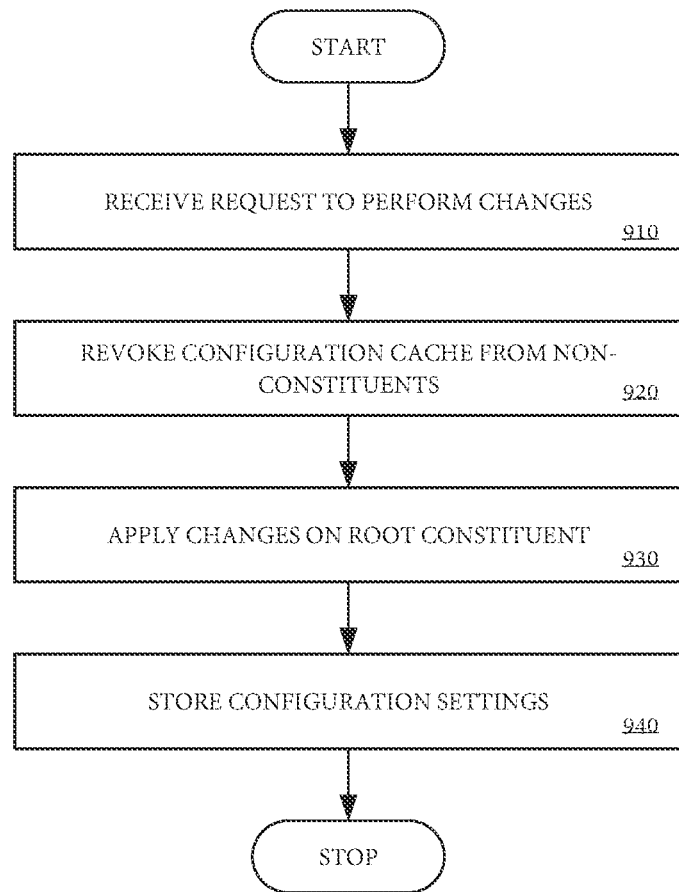
FIG. 9 is a flow diagram illustrating one embodiment of a process for performing configuration changes.

FIG. 9 is a flow diagram illustrating one embodiment of a process for performing configuration changes at a root constituent. At processing block 910, a request is received at, the root constituent to perform configuration changes. At processing block 920, the configuration cache file within the configuration cache is revoked at each non-root constituent (e.g., by sending a message to delete the configuration cache at each non-root constituent via remote access module 370). At processing block 930, the configuration changes to the root constituent are applied after revocation of the configuration cache files. At processing block 940, the configuration settings associated with the configuration changes are stored at the root constituent (e.g., in memory and the configuration resource cache 620).

Figure 10A:
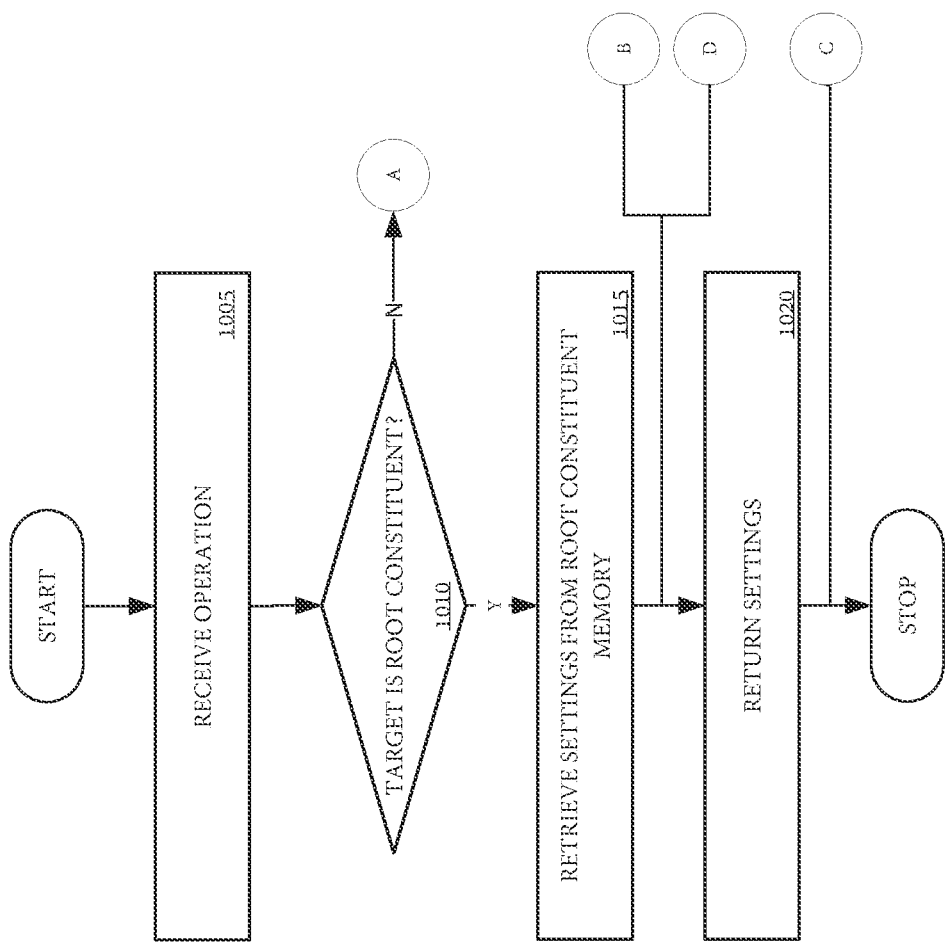
FIGS. 10A and 10B is a flow diagram illustrating one embodiment of a process for looking up configuration properties.
Figure 10B:
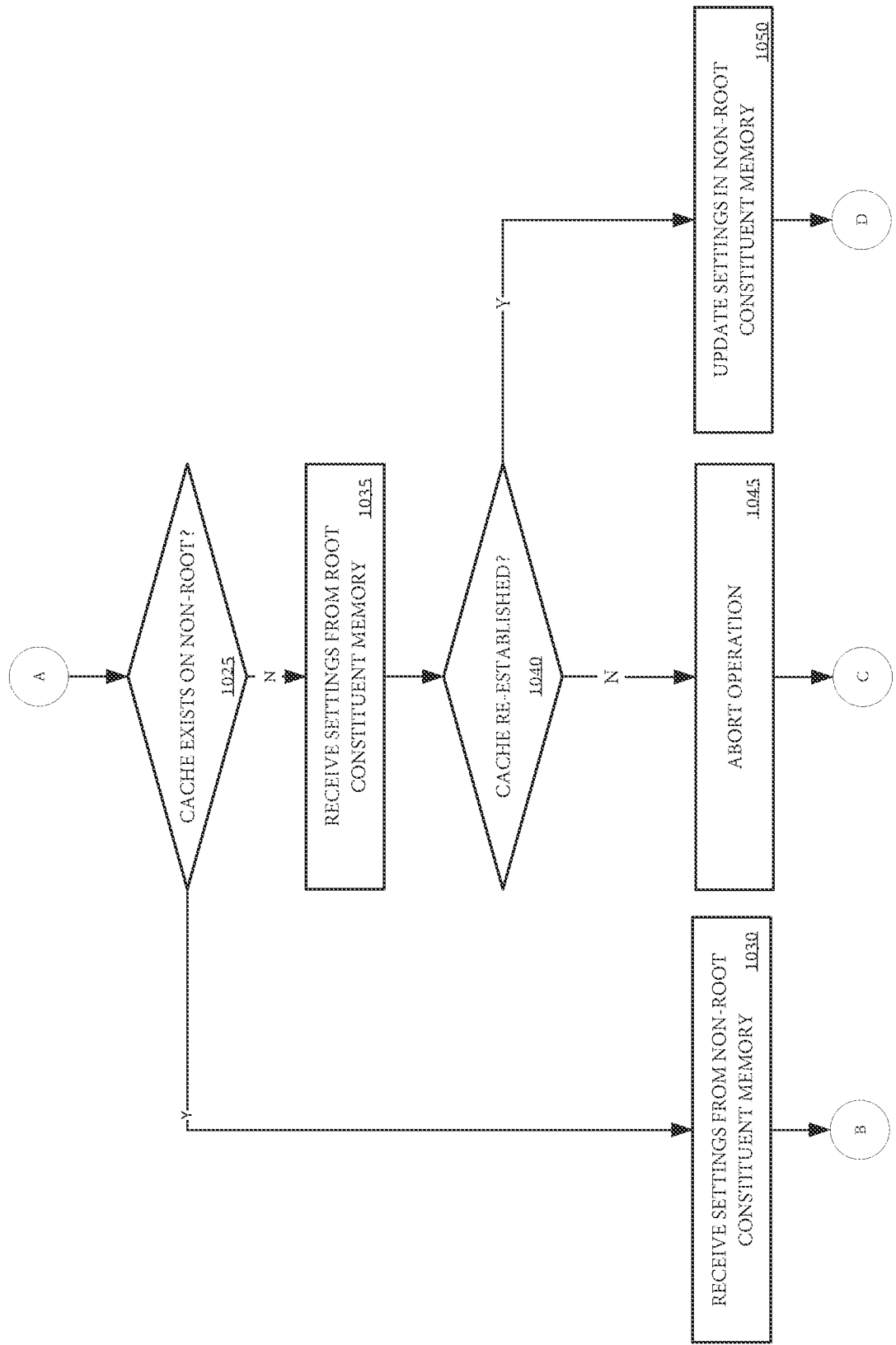

FIGS. 10A and 10B is a flow diagram illustrating one embodiment of a process for performing a looking of configuration properties. At processing block 1005 (FIG. 10A), an operation to be performed on one or more files stored within a constituent is received. At decision block 1010, a determination is made as to whether the target constituent of the operation is a root constituent. If so, the configuration settings are retrieved from the root constituent memory, processing block 1015. At processing block 1020, the configuration settings are returned as operation results.

Upon a determination at decision block 1010 that the target is a non-root constituent, a determination is made as to whether a configuration resource cache exists on the non-root constituent, decision block 1025 (FIG. 10B). If so, the memory configuration settings are considered valid. As a result, the configuration settings are received from the non-root constituent memory, processing block 1030. Subsequently, control is returned to processing block 1020 where the configuration settings are returned as operation results.

Upon a determination at decision block 1025 that the configuration resource cache does not exist, there is an attempt to re-establish the configuration resource cache. As a result, the configuration settings are received from the root constituent memory, processing block 1035. At decision block 1040, a determination is made as to whether the configuration resource cache has been re-established. If not, the operation is aborted, processing block 1045. Otherwise, the memory configuration settings of the constituent are updated at processing block 1050 prior to retuning control to processing block 1020 to return the configuration settings as operation results.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method performed by one or more processing resources of one or more computer systems, the method comprising:

receiving a data packet at a processing resource within a first of a plurality of nodes from a second of the plurality of nodes within a cluster switch fabric;

processing the data packet to retrieve an object from the packet including a compliance clock value of a second compliance clock operating at the second node;

updating, at the processing resource, a first compliance clock operating at the first node with the received compliance clock value to synchronize the first compliance clock with the second compliance clock, wherein a compliance clock determines a retention period of a file system stored at the first and second nodes;

storing, at the processing resource, the updated compliance clock value with a time the update occurred in reference to a system clock; and updating the clock operating at the first node with the received compliance clock value upon determining that the received clock value is greater than the stored value.

2. The method of claim 1, wherein the object comprises a member state object that stores a plurality of attributes corresponding to information associated with the second node.

3. The method of claim 2, wherein the object is received from the second node during a refresh operation between the first node and the second node.

4. The method of claim 1, further comprising updating a second object at the first node with the received compliance clock value.

5. The method of claim 1, further comprising ignoring the received clock value upon determining that the received compliance clock value is less than the stored value.

6. The method of claim 1, further comprising:
generating the compliance clock value at the second node; and
storing the compliance clock value as a component of the object.

7. A system comprising:
one or more processing resources; and
a non-transitory computer-readable medium, coupled to the processing resource, having stored therein instructions that when executed by the processing resource cause the processing resource to:
receive a data packet via a network at a first of a plurality of nodes from a second of the plurality of nodes within a cluster switch fabric;
process the data packet to retrieve an object from the packet;
update a first compliance clock operating at the first node with the received compliance clock value to synchronize the first compliance clock with the second compliance clock, wherein a compliance clock determines a retention period of a file system stored at the first and second nodes; and
store, at the processing resource, the updated compliance clock value with a time the update occurred in reference to a system clock; and
update the clock operating at the first node with the received compliance clock value upon determining that the received clock value is greater than the stored value.

8. The system of claim 7, wherein the processing resource further to update a second object at the first node with the received compliance clock value.

9. The system of claim 8, wherein the processing resource further to ignore the received clock value upon determining that the received compliance clock value is less than the stored value.

10. The system of claim 7, wherein the processing resource further to:
generate the compliance clock value at the second node; and
store the compliance clock value as a component of the object.

11. A non-transitory computer-readable storage medium embodying a set of instructions, which when executed by one or more processing resources cause the processing resources to:
receive a data packet via a network at a first of a plurality of nodes from a second of the plurality of nodes within a cluster switch fabric;
process the data packet to retrieve an object from the packet including a compliance clock value of a second compliance clock operating at the second node;
update a first compliance clock operating at the first node with the received compliance clock value to synchronize the first compliance clock with the second compliance clock, wherein a compliance clock determines a retention period of a file system stored at the first and second nodes;
store the updated compliance clock value with a time the update occurred in reference to a system clock; and
update the clock operating at the first node with the received compliance clock value upon determining that the received clock value is greater than the stored value.

12. The computer-readable storage medium of claim 11, wherein the object comprises a member state object that stores a plurality of attributes corresponding to information associated with the second node.

13. The computer-readable storage medium of claim 12, wherein the object is received from the second node during a refresh operation between the first node and the second node.

14. The computer-readable storage medium of claim 11, embodying a set of instructions, which when executed by the processing resources cause the processing resources to update a second object at the first node with the received compliance clock value.

15. The computer-readable storage medium of claim 14, embodying a set of instructions, which when executed by the processing resources cause the processing resources to ignore the received clock value upon determining that the received clock value is less than the stored value.

16. The computer-readable storage medium of claim 15, embodying a set of instructions, which when executed by the processing resources cause the processing resources to:
generate the compliance clock value at the second node; and
store the compliance clock value as a component of the object.

* * * * *